United States Patent [19]

Rigler et al.

[11] Patent Number: 4,495,224
[45] Date of Patent: Jan. 22, 1985

[54] METHOD FOR PREPARING IMPROVED MOLDING MATERIALS FROM COATED FINE PARTICULATE EXPANDABLE STYRENE POLYMERS AND APPLICATION OF THE COATED PRODUCTS

[75] Inventors: Josef-Karl Rigler, Recklinghausen; Horst Leithäuser; Heinz Osterhoff, both of Marl, all of Fed. Rep. of Germany

[73] Assignee: Chemische Werke Hüls A.G., Marl, Fed. Rep. of Germany

[21] Appl. No.: 538,906

[22] Filed: Oct. 4, 1983

[30] Foreign Application Priority Data

Oct. 26, 1982 [DE] Fed. Rep. of Germany ....... 3239563
May 11, 1983 [DE] Fed. Rep. of Germany ....... 3317169

[51] Int. Cl.$^3$ .......................... B05D 7/00; C08J 9/22
[52] U.S. Cl. ........................................ 427/222; 521/57
[58] Field of Search ........................... 427/222; 521/57

[56] References Cited

U.S. PATENT DOCUMENTS

| 3,480,570 | 11/1969 | Goole et al. | 521/57 |
| 3,560,414 | 2/1971 | Miskel et al. | 521/57 |
| 3,789,028 | 1/1974 | Heiskel et al. | 521/57 |
| 4,238,570 | 12/1980 | Shibata et al. | 521/57 |
| 4,281,036 | 7/1981 | Leithauser et al. | 521/57 |

FOREIGN PATENT DOCUMENTS

| 1093899 | 12/1967 | United Kingdom . |
| 1289466 | 11/1970 | United Kingdom . |
| 1408267 | 10/1975 | United Kingdom . |
| 1409285 | 10/1975 | United Kingdom . |

*Primary Examiner*—Morton Foelak
*Attorney, Agent, or Firm*—Wells & Wells

[57] ABSTRACT

A process for preparing improved molding materials of expandable styrene polymers by coating the particles with glycerin esters of long-chain fatty acids. The coating comprises organosols of pulverulent glycerin esters having 14 to 24 carbon atoms in aliphatic hydrocarbons having 3 to 8 carbon atoms. The proportion of glycerin monoester is at most 40, but not less than 10% by weight and the particle size of the pulverulent ester is less than 100 microns. The molding materials are used to manufacture molded articles.

12 Claims, No Drawings

METHOD FOR PREPARING IMPROVED MOLDING MATERIALS FROM COATED FINE PARTICULATE EXPANDABLE STYRENE POLYMERS AND APPLICATION OF THE COATED PRODUCTS

CROSS-REFERENCES TO RELATED APPLICATIONS

Applicants claim priority under 35 USC 119 for applications Nos. P 32 395 63.9, filed Oct. 26, 1982, and P 33 17 169.6, filed May 11, 1983, both in West Germany.

BACKGROUND OF THE INVENTION

The field of the invention is fine particulate, expandable styrene polymers for the preparation of molded articles. The present invention is particularly concerned with coating the particulate, expandable styrene polymers with organosols with glycerin esters of long chain fatty acids and using the coated expandable styrene polymers in the manufacture of molded foamed articles.

The state of the art of expandable polystyrene may be ascertained by reference to Kirk-Othmer, "Encyclopedia of Chemical Technology", 2nd Edition, Volume 9 (1966) under the section entitled "Foamed Plastics", pages 847–884, particularly pages 852, 853, and 855, where polystyrene is disclosed, and Volume 19 (1969) under the section entitled "Styrene Plastics", pages 85–134, particularly pages 116–120, where polystyrene foams are disclosed and U.S. Pat. Nos. 3,480,570; and 4,281,036; British Pat. Nos. 1,199,591; 1,409,285; 1,497,319; 1,093,899; and 1,289,466; and West German Published Application No. 12 98 274, the disclosures of which are incorporated herein by reference.

The state of the art of the glycerin esters of long chain fatty acids useful in the present invention may be ascertained by reference to U.S. Pat. Nos. 3,789,028 and 4,238,570, and British Pat. Nos. 1,408,267 and 1,409,285, the disclosures of which are incorporated herein by reference.

Expandable fine particulate styrene polymers, that is, fine particulate styrene polymers containing a gaseous or liquid expanding agent are known to be processed into molded articles by heating them in molds having access to the atmosphere to temperatures above the boiling point of the expanding agent and of the polymer softening point.

Conventionally the foamable particles are only incompletely foamed to begin with and after this step, known as "prefoaming", are sintered in a mold permitting access to atmospheric air in a procedure termed "foaming out", i.e., final foaming.

The particles must not sinter together or form agglomerates during prefoaming. Moreover, the particles must remain friable, while being moved and must not charge electrostatically.

After final foaming, the molded article must remain in the mold until the temperature in the mold drops below the softening point of the styrene polymer. If the molded article is prematurely removed from the mold, it may warp, collapse, or shrink. This mold ejection time is called the cooling or mold dwell time and, for obvious reasons, is desired to be as short as possible. Accordingly, the known coating of the surface of the foamable particles has two objectives: first, agglomeration must be prevented during prefoaming while being permitted during the final foaming (welding), and, second, the cooling time is shortened by the use of selected and suitable substances. Therefore a suitable surface coating is selected with respect to its type of performance. However, care is taken in order that the beads may be uniformly coated, that is, that the film thickness is the same on all bead fractions. This demands furthermore the need for finding a suitably adapted process for constant deposition of the coating materials.

Conventional coating materials are fine-pored pulverulent inorganic compounds such as silicon dioxide, talcum, clay, magnesium oxide, magnesium hydroxide, magnesium carbonate, further organic compounds such as waxes, metallic soaps, for instance magnesium or zinc stearate, ricinoleic acid amide, lauryl acid diethanolamide, bis-stearoyl-ethylene diamine, esters of fatty acids or polyhydroxy compounds such as glycerin or sorbit esters. These compounds are disclosed in U.S. Pat. No. 3,480,570; British Pat. Nos. 1,409,285 and 1,497,319; and Chemical Abstracts 95 (1981), Ref. Nr. 22 08 749. Finely pulverulent thermoplastics are disclosed in West German Published Application No. 1,298,274.

The glycerin esters of long chain fatty acids are disclosed in U.S. Pat. No. 3,789,028 and British Pat. Nos. 1,409,285 and 1,408,267. Mixtures of the various esters alsare cited, for instance in the Chemical Abstracts article mentioned above and in U.S. Pat. No. 4,238,570, where those esters are employed which contain no hydroxyl groups in the molecule and of which the melting point is between 50° and 110° C. Among the esters of long chain fatty acids, the sorbit ester is also known as a coating material for expandable, fine particulate styrene polymers as disclosed in U.S. Pat. No. 3,480,570 and British Pat. Nos. 1,093,899 and 1,289,466. In the known state of the art, either the coating materials must be jointly deposited as solutions on the expandable particle, or the pulverulent coating materials must be deposited by tumbling in drums. The sorbit esters fail to provide a satisfactory effect regarding mold ejection times. To the extent it is necessary to deposit the coating materials by tumbling in a drum, uneven coatings result and, therefore, the disclosed drawbacks are incurred. Again, glycerin ester mixtures of fatty acids are used in the form of solutions or tumbling drum deposited on the crude beads. Because such ester mixtures are insoluble in the hydrocarbon used, namely pentane, methanol must additionally be used as a solvent, whereby the additional drawback of the beads being attacked by the solvent is undergone. Furthermore, an additional extraneous substance is introduced into the process by the methanol.

In the procedure of British Pat. No. 1,408,267, a water-insoluble glycerin ester, preferably the oleic acid ester, together with an inorganic solid, is used. The mixture is used in the form of a suspension. No smooth and uniform coating is obtained as disclosed in this patent.

Lastly, the procedure of British Pat. No. 1,409,285, uses a glycerin mixture consisting predominantly of a glycerin ester mixture together with a metallic stearate. In this state of the art also, the mixture is preferably tumbling drum applied in dry form or, if need be, deposited as a suspension. Inherently such a procedure provides irregularly coated particles.

Again the further state of the art, cited above, coats in a similar manner.

In summation, it can be stated that the state of the art does not satisfactorily solve the problem of surface coating expandable polystyrene crude beads. While it is known that glycerin esters and finely distributed inorganic powders act effectively, a uniform coating is impossible when the prior art processes are used. The reason on the one hand is the temperature sensitivity of the material to be coated and on the other hand the poor solubility of the glycerin esters in cold solvents.

In tumbling drum deposition or dry mixing, the coating materials are irregularly distributed over the surfaces of the crude beads due to inadequate adhesion. Therefore, there are both excessive and deficient concentrations on the surface. This causes, during prefoaming, beads which partially lack any coating material on the surface and elsewhere have relatively too much thereon.

As a consequence, the individual particles in the final foamed molded article are poorly and irregularly welded to each other, so that ruptures occur. Such weak spots are present even more when in addition to the glycerin esters metallic soaps or inorganic solids also are used. When solvents are used also, or used exclusively, the bead surface is corroded, the main consequence being mutual bonding during prefoaming.

The process of U.S. Pat. No. 4,281,036, uses heated aqueous solutions and suffers from the drawback that substantial amounts of water must be evaporated. In addition, the warm or hot dispersions inevitably damage the expandable particles.

SUMMARY OF THE INVENTION

Having in mind the limitations of the prior art it is an object of the present invention to provide a process for coating fine particulate molding materials of expandable styrene polymers with a uniform deposit of glycerin esters of long chain fatty acids so that their processing properties are improved.

This object is achieved in the present invention by coating the fine particulate expandable styrene polymer particles with organosols of pulverulent glycerin esters having 14 to 24 carbon atoms in non-solvent aliphatic hydrocarbons having 3 to 8 carbon atoms. The glycerin esters have a glycerin monoester proportion of about 10 to 40% by weight and the pulverulent ester has a particle size less than about 100 microns.

The organosols can contain additionally about 0 to 40 percent by weight of metallic soaps based on the weight of glycerin ester.

As a rule, the organosols contain between about 5 and 35% by weight of solids. A concentration of about 10 to 20% by weight of solids is preferred.

DESCRIPTION OF THE PREFERRED EMBODIMENTS

Surprisingly, the selected glycerin esters form stable organosols in aliphatic hydrocarbons having 3 to 8 carbon atoms. The butanes are especially suited, the pentanes are especially preferred, that is, these hydrocarbons are used both in the normal and in the iso form or as mixtures thereof. Accordingly, the discussion below relates only to pentane or butane within this definition.

The organosols do not demix in the conventional processing steps such as pumping or spraying. It is especially advantageous that the organosols be stable at room temperature, whereby the expandable polystyrene is not temperature stressed. When pentane is used and it acts both as an expanding agent and a dispersant, the process remains free of extraneous materials. Pentane recovery is simple and complete.

Because of the low viscosity of the dispersion at room temperature, it is possible furthermore to apply substantial amounts of surfactant whereby advantages are derived in specific procedures such as making mold parts.

The deposition of the coating materials on the particulate styrene polymers is implemented by adding the organosols in an evacuated mixer and at room temperature. Following mixing, the hydrocarbon is removed by a brief evacuation. Adding the organosols in the manner of the present invention additionally achieves the result that the coating materials adhere only to the styrene polymers and not to the metal parts of the mixed aggregate. Because the organosols are also quite fluid even at lower temperatures between 0° and 20° C., the coating process is carried out without degrading the material properties, for instance the cellularity of the expandable polystyrene.

As a rule the organosols contain between 5 and 35, especially between 10 and 20, percent by weight of solids. Preferably pentane is used as the dispersant, the isomeric composition being only of minor significance.

The concentration of the coating materials to be deposited as a rule amounts to about 0.05 to 0.6, preferably 0.1 to 0.5% by weight, refered to the expandable styrene polymer. For the coarser particles (about 0.9 to 3.0 mm in diameter), concentrations of about 0.1 to 0.2% by weight are sufficient and as regards the smaller particles (about 0.3 to 0.9 mm in diameter), on the other hand, about 0.2 to 0.6% by weight are advantageously used.

The term glycerin esters of higher fatty acids means esterification products of long chain, saturated carboxylic acids having a C number of 14 to 24, especially, however, from 16 to 18, stearic acid esters of glycerin being especially preferred. Specific examples of the glycerin esters of higher fatty acids useful in the present invention include, in addition to glycerin stearate, glyceryl palmitate, mixtures of glyceryl stearate, glyceryl palmitate and glycerin esters of lauric and myristic acids (palm kernel glyceride).

Typically mixtures of mono-, di-, and tri-esters are formed when glycerin is esterified. As shown by the specific examples, it is important for the stability of the organosols and, hence, for the uniformity of coating, that the monoester content not exceed 40%; on the other hand, it should not be zero either. Advantageously, the percent by weight ratio of mono to di to tri-ester is 10 to 40% monoester, 10 to 70% di-ester, and 10 to 80% tri-ester, in particular 20 to 30% monoester, 20 to 70% di-ester, and 10 to 30% tri-ester. It is necessary, furthermore, that the powder particulate size be less than 100 microns. The organosol stability is further assured when additionally fine particulate salts of long chain fatty acids (metallic soaps) such as zinc stearate are used.

Monomeric styrene, nuclear substituted styrene, in particular p-methyl styrene or monomer mixtures with at least 50% by weight of styrene are used to prepare the fine particulate expandable styrene polymers. Suitable monomers for instance are alpha-methylstyrene, nuclear halogenated styrenes, acrylonitrile, esters of the acrylic and methacrylic acids of alcohols having 1 to 8 carbon atoms, N-vinyl compounds such as N-vinylcarbazol or also slight amounts of butadiene or divinylbenzene.

The suspension polymerization is carried out at temperatures of 80° to 130° C. It is initiated in conventional manner with one or more radical-forming substances, for instance t-butylperbenzoate, t-butylperoctoate, di-t-butylperoxide, or their mixtures.

Organic protective colloids such as polyvinyl alcohol, polyvinylpyrrolidone or polyvinylpyrrolidone copolymers or finely-distributed suspending agents such as finely-distributed tricalcium phosphate and barium phosphate or also mixtures of organic protective colloids and mineral suspending agents can be used in known manner as suspension stabilizers.

The expanding agents used are the known low boiling point, expanding, liquid aliphatic hydrocarbons, such as pentane, hexane, cycloaliphatic hydrocarbons such as cyclohexane or hydrogen halides such as dichlorodifluoromethane, 1,2,2-trifluoro-1,1,2-trichloroethane, or also mixtures of these compounds. The expander proportion is between 3 and 15% by weight, preferably between 5 and 8% by weight, referred to the styrene polymer.

The expandable styrene polymers may contain the conventional flame-resistant means such as organic halogen compounds, in particular bromine compounds; among these in particular are the completely or partly brominated oligomers of butadiene or isoprene with an average degree of polymerization of 2 to 20, for instance 1,2,5,6-tetrabromocyclooctane; 1,2,5,6,9,10-hexabromocyclododecane, brominated polybutadiene with a degree of polymerization for instance between 3 and 15.

The organic halogen compounds are contained in proportions from 0.4 to 3% by weight in the expandable styrene polymer. In addition to the flame-resistant halogen compounds, the known synergists are used in the known rates, preferably organic peroxides, in particular those with a half-life of at least 2 hours at 373° K.

The expandable styrene polymers moreover may contain additives such as dyes, fillers and stabilizers. In view of the preparation of the expandable styrene polymers, they are present in fine-particulate form (for instance as beads) and, as a rule, the particle diameters are between 0.4 and 3 mm. When in the pre-foamed state, the expandable styrene polymers are conventionally final foamed by heating in molds accessible to atmospheric air and sintered into foamed articles of which the sizes correspond to the cavities of the molds used. The styrene polymers are processed into extraordinarily dimensionally stable molded articles. Foam blocks 1×1×0.5 m in size after removal from the mold are susceptible only in exceedingly minute manner to concave sidewalls. The foamed articles or blocks furthermore are characterized by an especially good welding among the individual particles. Therefore, they evidence especially good mechanical stability.

SPECIFIC EXAMPLES

Example (E) and comparison tests (V) show the advantageous results compared to the state of the art.

(1) PREPARING THE ORGANOSOLS

Technically pure pentane (a mixture of n- and isopentane) is placed in a glass beaker equipped with a flat blade mixer. The coating materials are added with stirring. Stirring proceeds about 1 hour after termination of the input of the coating materials. The stability of the organosols formed is tested by observing the phase separation after a 12-hour storage (Table 1).

Notes re Table 1:
(1) The degree of esterification is ascertained by measuring the OH or the saponification number;
(2) The particle size is analyzed using a laser light-scattering instrument (MICROTRACK);
(3) Referred to the amount of glycerin stearate; and
(4) The organosols were left standing 12 hours in a settling cylinder. After that time a more or less pronounced phase separation took place depending on the organosol stability.

The Examples show that when the conditions of the present invention are observed, stable organosols of the glycerin esters alone and also in combination with finely distributed inorganic solids are obtained.

TABLE 1

Organosols Stability

| | Composition of the glycerine stearate[1] | | | Glycerin Stearate particle size[2] | | Addition of inorganic salt[3] | | % by weight solid concentration in the organosol % by weight | Organosol stability[4] % by volume of organosol after 12 hours |
|---|---|---|---|---|---|---|---|---|---|
| | % mono-ester | % Di-ester | % Tri-ester | % < 100 μm | % > 100 μm | type | % by weight | | |
| E 1 | 30 | 70 | — | 100 | — | — | — | 20 | 98 |
| E 2 | 30 | 70 | — | 100 | — | Zn-stearate | 30 | 20 | 98 |
| E 3 | 10 | 10 | 80 | 100 | — | Zn-stearate | 30 | 20 | 100 |
| E 4 | 40 | 45 | 15 | 100 | — | — | — | 20 | 98 |
| E 5 | 30 | 70 | — | 100 | — | — | — | 10 | 98 |
| V 1 | 90 | 10 | — | 100 | — | — | — | 20 | 30 |
| V 2 | 30 | 70 | — | 50 | 50 | — | — | 20 | 50 |
| V 3 | 30 | 70 | — | 10 | 90 | — | — | 20 | 20 |
| V 4 | 90 | 10 | — | 10 | 90 | — | — | 20 | 20 |
| V 5 | 30 | 70 | — | 50 | 50 | Zn-stearate | 30 | 20 | 30 |

(2) COATING THE PARTICULATE STYRENE POLYMERS

The particulate styrene polymers are placed in a vacuum screw cone mixer. With the material being revolved, the organosols are sprayed from above onto the beads. The addition is followed by 10 more minutes of mixing and ensuing evacuation. The pentane used is quantitatively recovered. Analysis shows that all of the amount of coating material used has been deposited on the beads.

(3) TESTING THE PROCESSING BEHAVIOR

The coated and foamable polystyrene was prefoamed in a continuous agitator prefoamer by means of steam to a bulk weight of about 15 g/l. The prefoamed material was stored for 24 hours and then processed both in an automatic block mold (1×0.5×0.5 m) and in an automated machine for molded parts.

1. Foam panels 5 cm thick and stored for one day are broken over an edge. An estimate is made of the ratio of the particles ruptured thereby to those visible in the break area and is stated in %. A rupture of 0% indicates that the adhesion of the prefoaming beads to each other is less than the strength of the prefoaming beads themselves; 100% means that only ruptured particles can be seen.
2. Test bodies sized 5×2.5×20 cm are removed from the four side surfaces of a molded article (fish-box). These test bodies are so clamped into the testing equipment that one side is kept at the origin of a circle. At a distance of 16.5 cm a punch means of constant shear presses on the end until rupture takes place. Both the angle and the force applied at the point of rupture are measured. The corresponding angle is designated as the angle of flexure, and the force (N/mm$^2$) as the flexure strength. The measurements in each case are preformed on 100 molded parts. The mean values and the standard deviations are listed.

TABLE 2

Prefoaming efficiency (bulk weight, output).
The example shows the effect of surface coating on the prefoaming efficiency.

| Test # | Process | % by weight of glycerin stearate | drying time (min.) | bulk weight (g/l) | output (kg/h) |
|---|---|---|---|---|---|
| O sample | — | — | — | 14.8 | 450 |
| E 6 | organosol (pentane) (E1) | 0.3 | 5 | 14.9 | 455 |
|  |  | 0.1 | 5 | 14.8 | 450 |
| V 6 | aqueous[1] dispersion | 0.1 | 120 | 15.0 | 380 |
|  |  | 0.3 | 240 | 15.2 | 250 |

[1] process per U.S. Pat. No. 4,281,036.

Rauscher type prefoamer; bead size; 0.9 to 1.6 mm; organosol or aqueous dispersion concentration=20% by weight; drying temperature=25° C., drying pressure=10 mbar.

The prefoaming output is not degraded in the case of the organosol of the present invention due to the rapid evaporation of the dispersant required for the coating. Together with the evaporation of the water, some of the expanding agent is also removed, resulting in a lower rate of prefoaming.

TABLE 3

This table relates to processing foamed blocks (Rauscher block mold, 1 × 0.5 × 0.5 m) and bead sizes from 0.9 to 1.6 mm.
The quality of the foam block is determined by high degrees of welding and low block shrinkages.

| Test # | Organosol from | % by weight of Surfactant | bulk Weight g/l | MFZ (++) min[3] | degree of block welding %[3] | shrinkage %[3] |
|---|---|---|---|---|---|---|
| E 6 | E 1 | 0.3 | 15.0 | 15 ± 2 | 90 ± 10 | 0.6 ± 0.2 |
| E 7 | E 2 | 0.3 | 15.1 | 17 ± 1 | 90 ± 10 | 0.5 ± 0.2 |
| E 8 | E 3 | 0.2 | 15.1 | 10 ± 1 | 90 ± 10 | 0.5 ± 0.2 |
| E 9 | E 4 | 0.2 | 15.0 | 13 ± 2 | 90 ± 10 | 0.5 ± 0.2 |
| V 7 | V 1 | 0.3 | 15.0 | 17 ± 7 | 40 ± 40 | 1.0 ± 0.5 |
| V 8 | V 2 | 0.3 | 14.8 | 18 ± 10 | 50 ± 40 | 1.0 ± 0.7 |
| V 9+ | — | 0.3 | 15.0 | 18 ± 8 | 50 ± 40 | 1.2 ± 0.7 |

(+) dry powder is tumbling drum-deposited
(++) minimum mold dwell time
[3] averages with standard deviations.

TABLE 4

Processing into molded articles (Heitz automatic Molder, fish-box mold, bead size from 0.9 to 0.63 mm).

| Test # | Organosol from | % by weight of surfactant | Water cooling time sec(++) | flexure angle degrees(++) | flexure strength N/mm$^2$(++) |
|---|---|---|---|---|---|
| E 10 | E 1 | 0.2 | 35 ± 1 | 19 ± 1 | 0.30 ± 0.01 |
| E 11 | E 1 | 0.4 | 15 ± 0 | 17 ± 0 | 0.26 ± 0.01 |
| E 12 | E 2 | 0.4 | 17 ± 0 | 16 ± 0 | 0.26 ± 0.01 |
| E 13 | E 3 | 0.4 | 10 ± 0 | 17 ± 0 | 0.28 ± 0.01 |
| E 14 | E 4 | 0.4 | 12 ± 1 | 17 ± 1 | 0.28 ± 1 |
| V 10 | V 1 | 0.4 | 12 ± 6 | 15 ± 5 | 0.25 ± 0.05 |
| V 11 | V 2 | 0.4 | 13 ± 7 | 14 ± 6 | 0.25 ± 0.07 |
| V 12(+) | — | 0.3 | 35 ± 10 | 17 ± 8 | 0.25 ± 0.08 |

(+) dry powder is tumbling drum-deposited
(++) averages with standard deviations

What we claim is:

1. In a method for coating fine particulate expandable styrene polymers with glycerin esters of long chain fatty acids, the improvement comprising:
    (a) introducing said fine particulate expandable styrene polymers into a closed mixing vessel;
    (b) preparing organosols of said glycerin esters having 14 to 24 carbon atoms in non-solvent aliphatic hydrocarbons having 3 to 8 carbon atoms, said glycerin esters being in pulverulent form and having a glycerin monoester proportion of about 10 to 40% by weight and a particle size less than 100 microns;
    (c) adding said organosols to said fine particulate expandable styrene polymers with mixing;
    (d) removing said non-solvent aliphatic hydrocarbons by reducing the pressure in said mixing vessel; and
    (e) separating said fine particulate expandable styrene polymers coated with said glycerin esters.
2. The method of claim 1 wherein said organosols additionally contain up to about 40% by weight of metallic soaps referred to the glycerin ester.
3. The method of claim 1, wherein said aliphatic hydrocarbon is pentane.
4. The method of claim 1, wherein said pulverulent glycerin ester is glycerin stearate.
5. The method of claim 1, wherein said organosols contain about 5 to 35% by weight of solids.
6. A method of molding foamed styrene polymers comprising:
    (a) introducing fine particulate expandable styrene polymers containing expanding agents into a closed mixing vessel;
    (b) preparing organosols of glycerin esters having 14 to 24 carbon atoms in non-solvent aliphatic hydrocarbons having 3 to 8 carbon atoms, said glycerin esters being in pulverulent form and having a glycerin monoester proportion of about 10 to 40% by weight and a particle size less than 100 microns;
    (c) adding said organosols to said fine particulate expandable styrene polymers with mixing;
    (d) removing said non-solvent aliphatic hydrocarbons by reducing the pressure in said mixing vessel;
    (e) separating said fine particulate expandable styrene polymers coated with said glycerin esters; and
    (f) introducing said coated fine particulate expandable styrene polymers into a mold open to atmospheric air, applying heat to said mold above the boiling point of said expanding agent and above the softening point of said glycerin esters.

7. The method of claim 5, wherein said organosols contain 10 to 20% by weight of solids.

8. The method of claim 6, wherein said organosols additionally contain up to about 40% by weight of metallic soaps referred to the glycerin ester.

9. The method of claim 6, wherein said aliphatic hydrocarbon is pentane.

10. The method of claim 6, wherein said pulverulent glycerin ester is glycerin stearate.

11. The method of claim 6, wherein said organosols contain about 5 to 35% by weight of solids.

12. The method of claim 11, wherein said organosols contain about 10 to 20% by weight of solids.

* * * * *